INVENTOR.
ROLAND CHILTON.
ATTORNEY

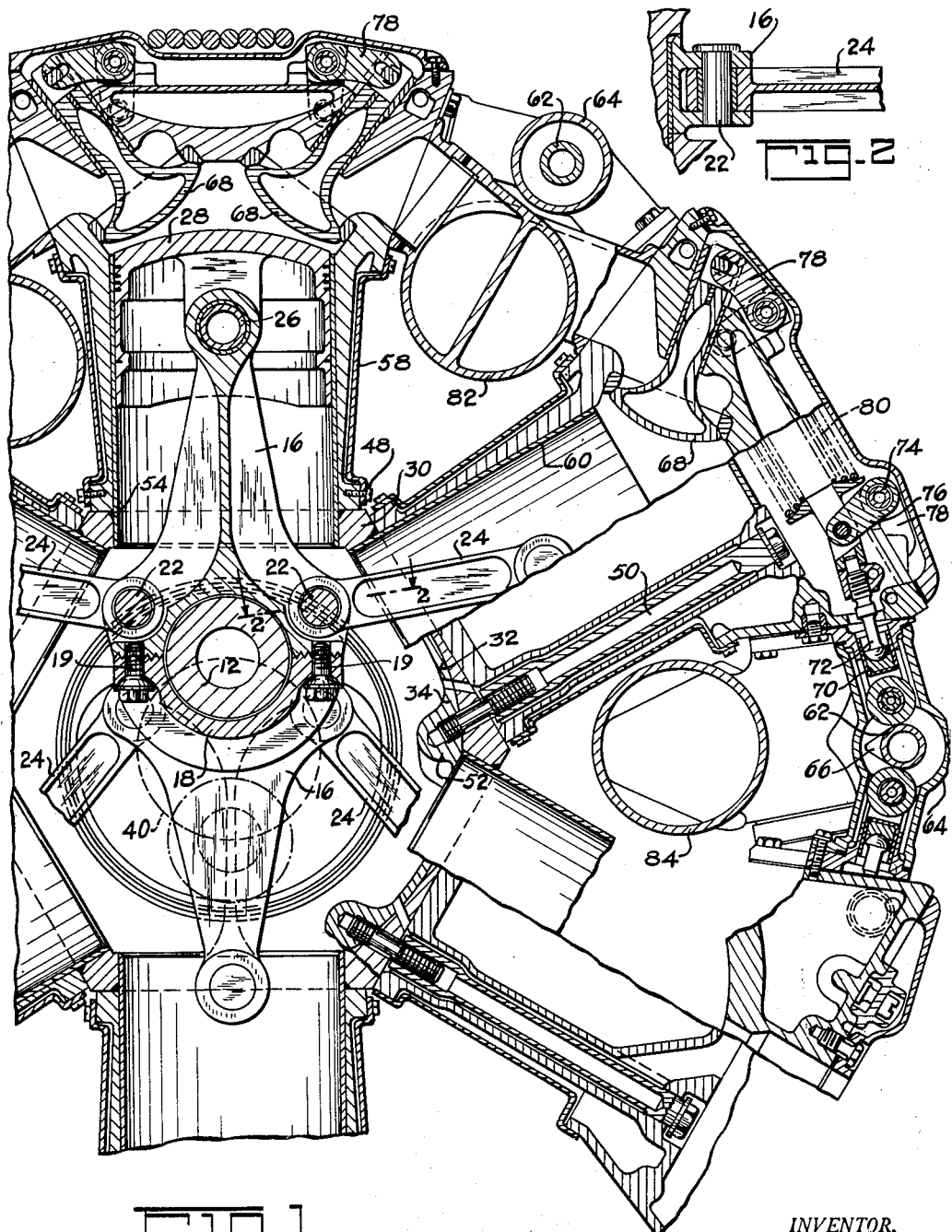

Dec. 12, 1950     R. CHILTON     2,533,558
INTERNAL-COMBUSTION ENGINE AND CONNECTING
ROD STRUCTURE THEREFOR

Filed June 28, 1946     5 Sheets-Sheet 3

INVENTOR.
ROLAND CHILTON.

BY

ATTORNEY

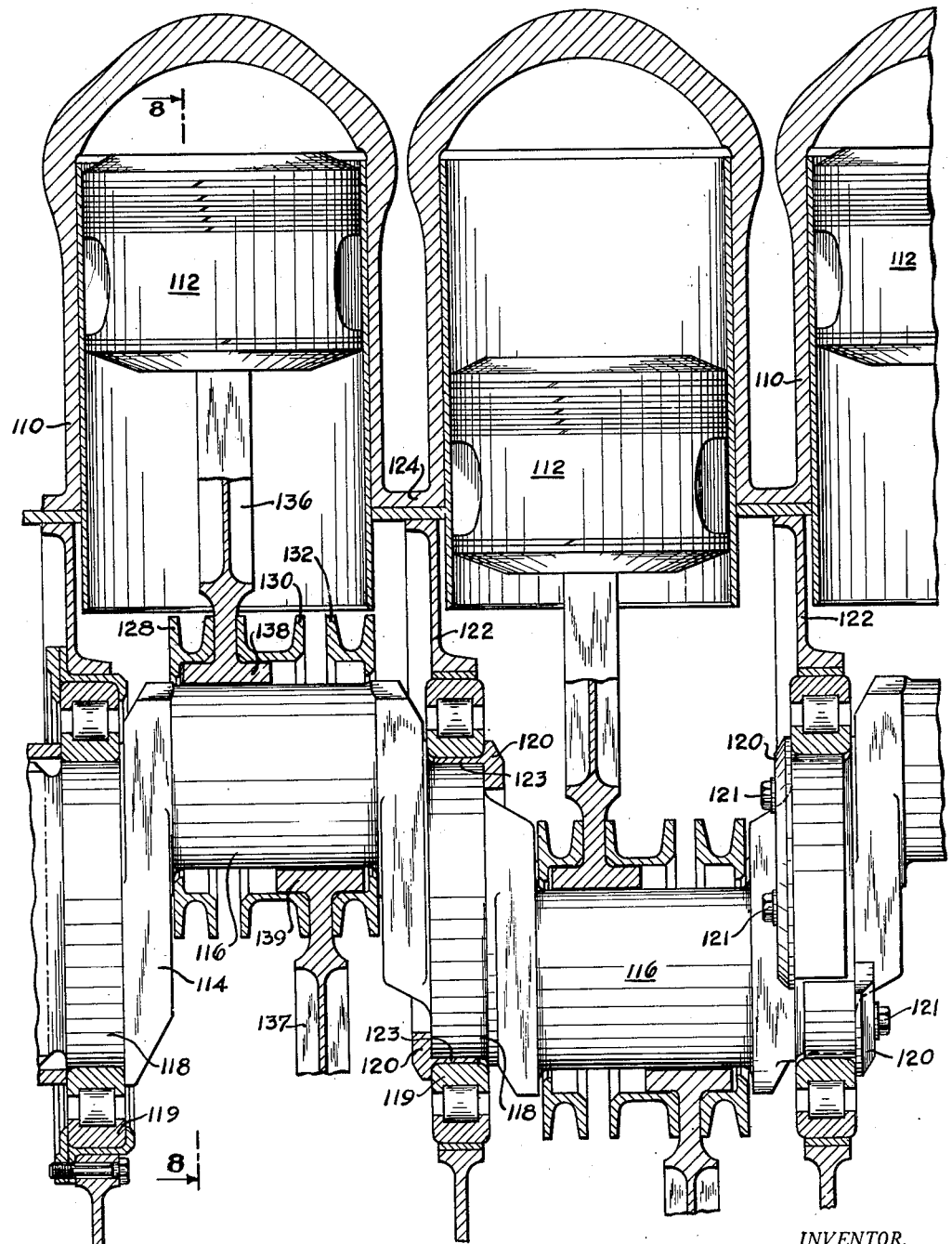

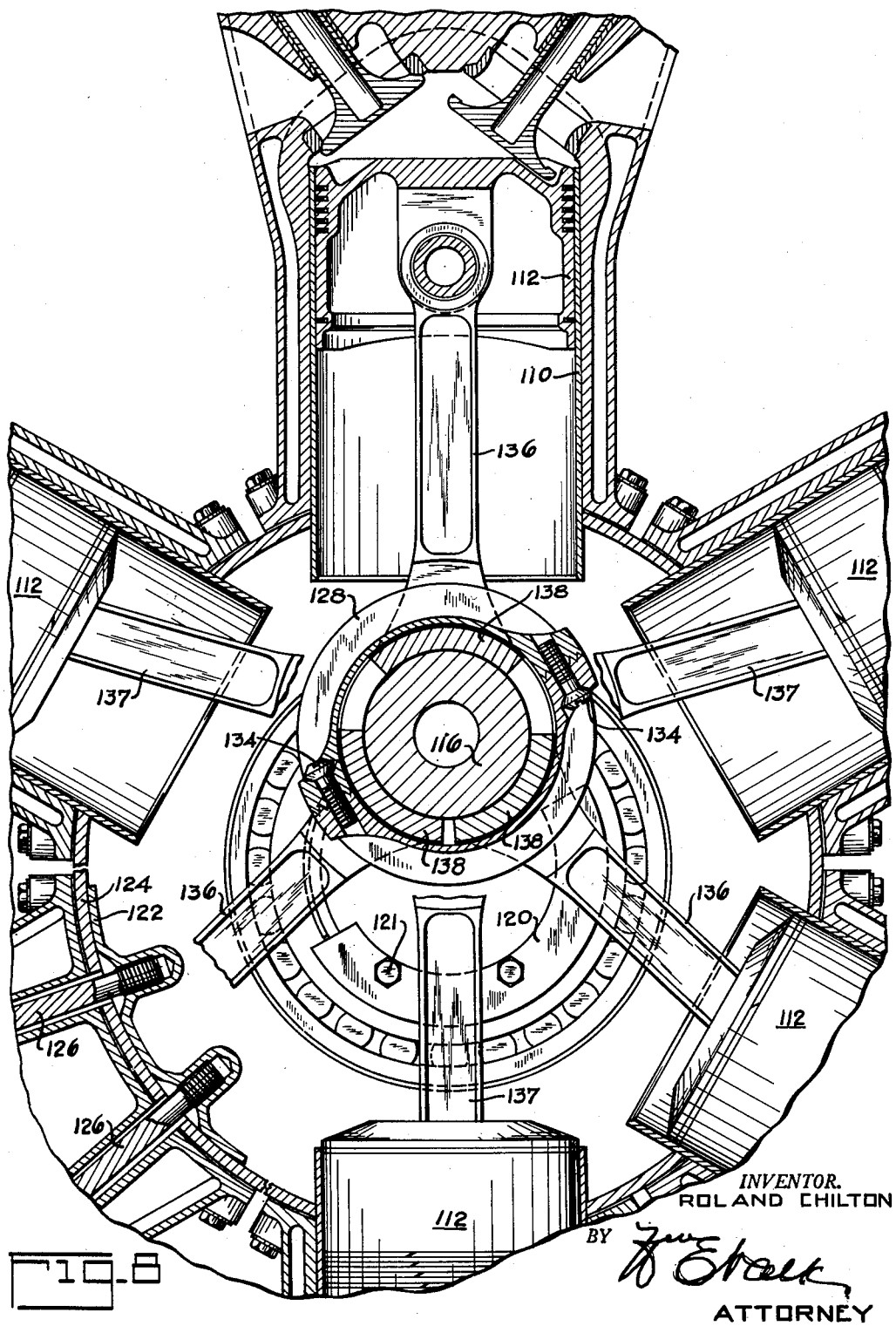

Patented Dec. 12, 1950

2,533,558

UNITED STATES PATENT OFFICE 2,533,558

INTERNAL-COMBUSTION ENGINE AND CONNECTING ROD STRUCTURE THEREFOR

Roland Chilton, Ridgewood, N. J., assignor to Wright Aeronautical Corporation, a corporation of New York Application June 28, 1946, Serial No. 680,189

1 Claim. (Cl. 121—120)

This invention relates to internal combustion engines and is a continuation in part of my co-pending application Serial No. 456,295, filed August 25, 1942, now Patent No. 2,404,828, issued July 30, 1946.

One object of this invention is to provide an improved arrangement of the main elements of the engine power section in order to provide a maximum of gross piston area displacement within minimum external engine dimensions. To this end, one feature of the invention comprises a novel connecting rod arrangement and construction.

A further object of this invention comprises a cylindrical-deck-type crankcase for a radial cylinder engine, thereby providing a simpler and more economical crankcase construction.

Further objects of the invention will become apparent upon reading the annexed detailed description in connection with the drawing in which:

Figure 1 is a radial sectional view through an engine embodying the invention;

Figure 2 is an axial sectional view along line 2—2 of Figure 1;

Figure 7 is a radial sectional view through a further modification of the invention; and Figure 8 is a sectional view along line 8—8 of Figure 6.

In the following description, the term "row" of cylinders is used to define a plurality of cylinders arranged radially around a common crankpin and the term "bank" denotes a plurality of cylinders alined axially of the crankshaft and individually cooperating with respective crankpins thereon. The number of rows of radial cylinders, i. e., the number of cylinders per bank is selected according to the power requirements but an even number of cylinders, and preferably six, is utilized for the individual radial rows in order to realize advantages flowing from an improved connecting rod disposition.

Figure 3:
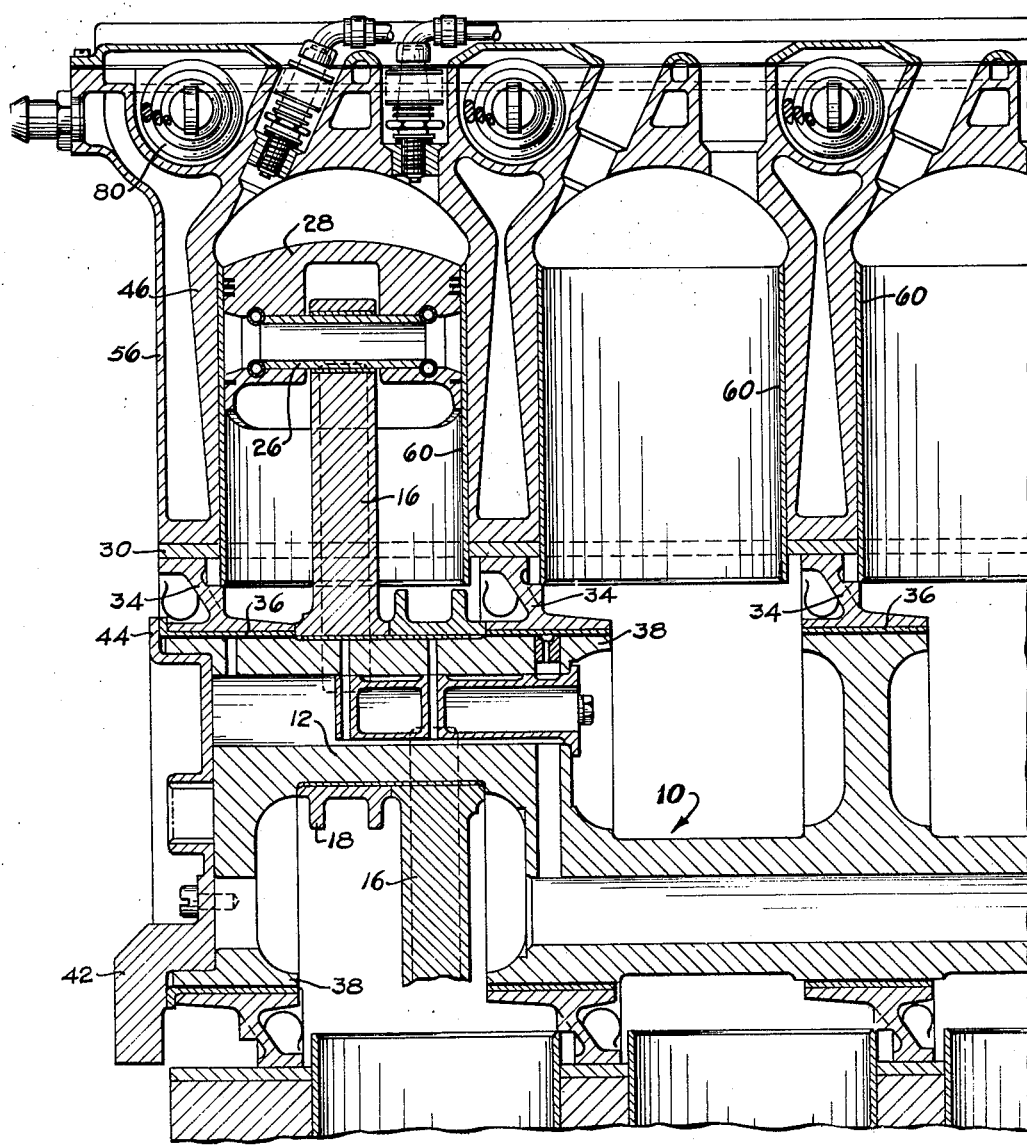
Figure 3 is an axial section through a bank of cylinders.

Referring first to Figures 1–3, the engine comprises a crankshaft 10 having a plurality of crankthrows equal in number to the number of engine cylinders per bank. That is, the crankshaft is provided with one crankpin 12 for each row of engine cylinders. Two similar connecting rod sets or assemblies are disposed in side-by-side relation on each crankpin 12, each set comprising a master rod 16 having a detachable cap 18 secured thereto by screws 19. The main body portion of each master rod carries two knuckle pins 22—one on each side of the master rod—so that the cap portion 18 of each master rod is free of knuckle pins. A pair of auxiliary connecting rods 24 are pivotally connected to each master rod, each upon one of the knuckle pins 22. The master rods and their auxiliary connecting rods are pivotally connected to wrist pins 26 of pistons 28 slidable within the engine cylinders, the auxiliary connecting rods 24 serving the pistons disposed on opposite sides of the piston served by their master connecting rod. As illustrated, the upper three cylinders of each row are served by one master rod and its two auxiliary connecting rods and the three bottom cylinders of each row are served by the adjacent master rod with its two auxiliary connecting rods. Accordingly, the three upper cylinders of each row are offset axially along the crankshaft relative to the three lower cylinders of the same row by an amount equal to the offset of the side-by-side master connecting rods.

It is well known that one of the prime limitations on engine diameter is the connecting rod length necessary to avoid excessive rod angularity and that, for a given maximum rod angularity and in a connecting rod assembly comprising a master connecting rod with link or auxiliary connecting rods articulated thereto, the length required for the link rods is dictated by those engaging knuckle pins most remote from the master rod. In this invention, only two knuckle pins are used on each master rod, and these, being adjacent to the master rod, require only a minimum length of auxiliary conecting rod to keep within the prescribed angularity limits. Such three-way articulated rods are individually old in the art, but their disposition side by side on a common crankpin in a 6-cylinder radial disposition is new as far as I am aware. It is also old to use two oppositely disposed co-planar master rods of the so-called straddle type where one master rod embraces and articulates upon the crankpin-bearing of the other, but such arrangements result in dissimilar master rods wherein it is difficult to achieve the desired rigidity without undue bulk and weight. Also, bearing troubles have resulted in the use of these oppositely disposed co-planar master rods wherein one master rod bearing is wrapped around the other.

The detachable cap feature of the simple and identical three-way rods of this invention permits the use of a one-piece crankcase and a one-piece crankshaft. The crankcase 30 consists of a single unitary tubular member having a circular bore 32 into which bearing diaphragms 34 are shrunk and preferably brazed. These bearing diaphragms have large bore bearings 36 supporting disc type journals 38 of the crankshaft 10 which is made in one piece. In Figure 1, the dot-and-dash line 40 indicates the path of travel of the center of the crankpin. Counterweight members 42 having end location flanges 44 are secured to each end of the crankshaft. It will be seen that by detaching one of these counterweight members and the connecting rods, the crankshaft may be disassembled axially through the bearings 36. This construction affords a virtually one-piece crankcase which is more rigid and lighter than the conventional split crankcase involving bolted joints.

Each cylinder bank comprises a unitary block 46 secured to flat decks 48 of the polygonal crankcase 30 by through bolts 50 threaded into tapped bosses 52 in the bearing diaphragms 34, whereby these are further secured and made rigid with the crankcase 30. The edges of the crankcase cylinder openings are chamfered for the reception of a soft ring gasket seal 54. The cylinders of each bank are enclosed in a water jacket 56 closed by cover plates 58 and each cylinder bore is provided with a shrunk-in lining 60.

The engine is provided with a special low valve gear in order to keep the outer diameter of the engine as small as possible. This valve gear comprises cam shafts 62 driven from the engine crankshaft and disposed between each bank of engine cylinders. Each cam shaft 62 is disposed within a housing 64 and is provided with cam lobes 66 for operation of one valve 68 of each cylinder of the adjacent cylinder banks. Briefly, the valve gear for each valve comprises a tappet member 70 with which a push rod 72 is engageable. A rocker member 74 has offset arms 76 and 78, the arm 76 being pivotally connected with the push rod 72 and the other arm 78 having a push-pull connection with a valve stem. In addition, a spring 80 extends across each cylinder and acts against the push rods 72 for both valves 68 of said cylinder for urging both said valves in a closing direction. The details of this valve gear are more fully disclosed in applicant's aforementioned co-pending application.

Inwardly of the cam shafts 62, in alternate intercylinder bank spaces, are three inlet manifolds 82 and three exhaust manifolds 84. In this connection, it should be noted that the inlet ports of adjacent cylinder banks face each other and the outlet ports of adjacent cylinder banks face each other so that each inlet and exhaust manifold accommodates the cylinders of the two adjacent cylinder banks. With this arrangement, the inlet and exhaust manifolds are disposed in alternate intercylinder bank spaces and are disposed inwardly of the cam shafts in each of these spaces.

Figure 4:
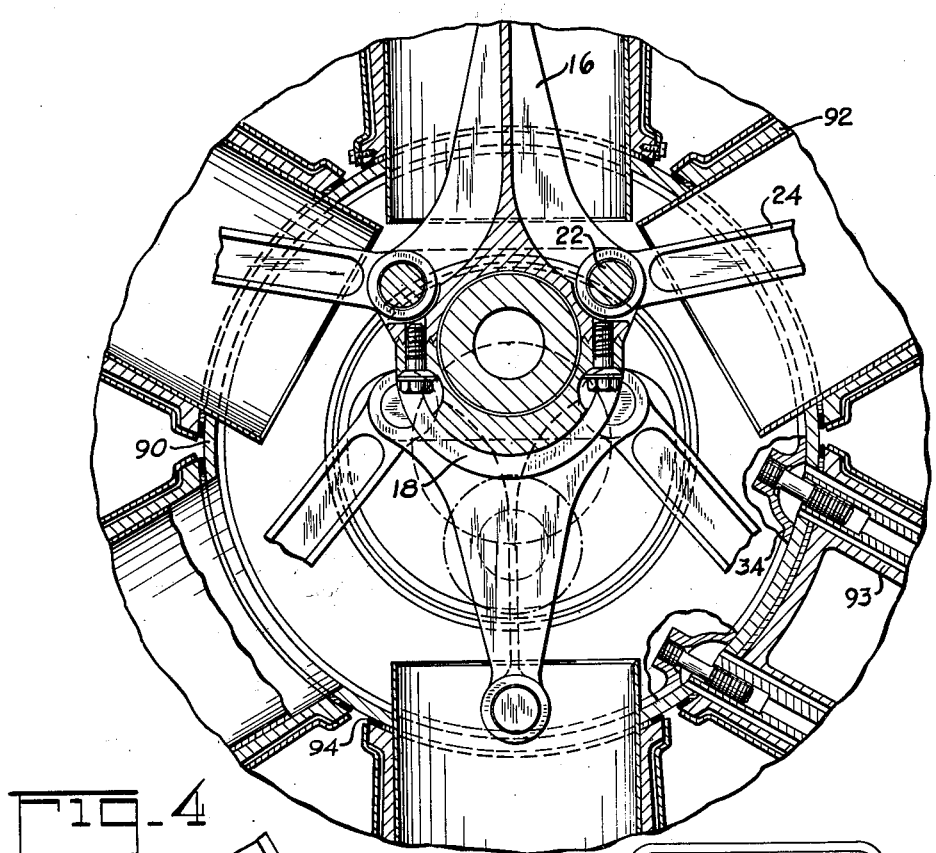
Figure 4 is a radial sectional view through a modification of Figure 1 illustrating a cylindrical type crankcase.
Figure 5:
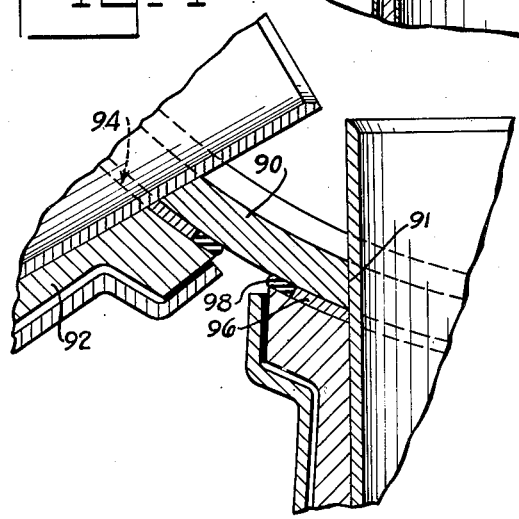
Figure 5 is an enlarged sectional view of a portion of Figure 4.
Figure 6:
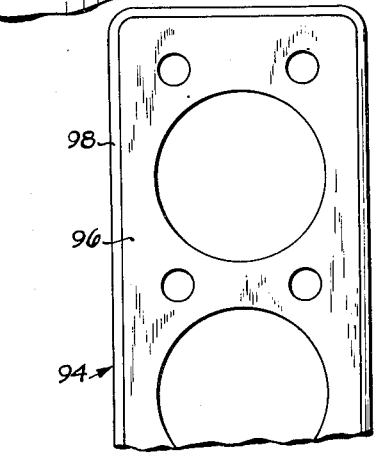
Figure 6 is a plan view of the gasket provided in the modification of Figures 4 and 5 between each cylinder and the crankcase.

Figures 4 and 5 disclose a modified crankcase construction. A cylindrical deck type crankcase for radial engines is a much simpler and more economical construction as compared to the usual polygonal crankcase defining flat cylinder decks on the sides thereof. The difficulty with a cylindrical deck crankcase lies in the provision of an adequate seal between the cylinders and the crankcase. In view of the stresses between the crankcase and cylinders, metal-to-metal contact therebetween is essential. If a soft or resilient gasket were provided between the cylinder and crankcase, the vibratory stresses in effect would cause the gasket to work out from under the cylinder. Also, in view of the cylindrical surface of the crankcase, it is not readily possible to chamfer the edge of the cylinder openings in the crankcase for the reception of a soft ring gasket, as in the usual polygonal crankcase construction (see gasket 54 in Figure 1).

Figures 3 and 4 disclose a radial type engine construction similar to Figure 1 but in which a cylindrical deck type crankcase 90 has been substituted for the polygonal deck type crankcase. The cylindrical crankcase is provided with cylinder openings 91 about which the cylinder banks 92 are saddled and secured by bolts 93. To this end, the surface of the cylinder banks 92 facing the crankcase necessarily has a cylindrical contour similar to that of the adjacent outer crankcase surface. A gasket 94, having a sheet metal portion 96, is provided between the crankcase 90 and the cylinder banks, thereby providing a metal-to-metal contact for absorbing the stresses between the crankcase and cylinder banks. The gasket 94, best seen in Figures 4 and 5, is provided with a peripheral portion 98 of rubber or other resilient material vulcanized to the metal portion 96. This rubber portion in its unstressed condition may have a circular cross section having a diameter greater than the thickness of the sheet metal portion. However, this rubber-like portion 98 may have any appropriate cross section provided that in its unstressed condition it has a maximum thickness greater than the thickness of the flat metal portion 96. Consequently, when the cylinder banks are bolted to the crankcase, the rubber-like portion is flattened to thereby provide an adequate seal. Except for the above described crankcase construction, the engine illustrated in Figures 3 and 4 is similar to that illustrated in Figure 1.

As illustrated and described, the gasket 94 is used between the cylinders of an engine and the crankcase to which the cylinders are secured. Obviously, however, the gasket is of general application and is not limited to this specific use. Also, the rubber-like material may be secured to the inner, instead of to the outer, edge of the metal portion of the gasket. In the construction illustrated in Figures 3, 4 and 5, it is essential that the rubber-like material be disposed along the outer edge of the metallic gasket portion in order to prevent oil leakage outwardly from the cylinder hold-down bolts 93.

Figures 7 and 8 illustrate a further modification of the invention comprising a slipper-type connecting rod construction in lieu of the previously described master rod construction. In Figures 7 and 8, the engine is generally similar to that illustrated in Figures 1 and 2 and comprises a plurality of rows of radial cylinders 110 with six cylinders per row, each having pistons 112 slidable therein. The engine crankshaft 114 comprises a one-piece construction having a plurality of crankpins 116 equal in number to the number of cylinder rows. The crankshaft 114 is provided with journals 118 adjacent its crankpins 116 and about which roller bearings 119 are disposed. The roller bearings 119 disposed between the crankpins 116 are each secured to the crankshaft by a pair of semi-circular mounting segments 120 which in turn are secured to the crankshaft by screws 121. Each bearing mounting segment 120 is semi-circular and is diametrically opposed to and engages the side of the inner race of its roller bearing opposite to the side engaged by the other mounting segment of said bearing. Also, because of the one piece crankshaft construction, the inner races of the intermediate roller bearings 119 have an internal diameter slightly larger than the diameter of its crankshaft journal in order to permit assembly of the roller bearings about their journals. The space between each of these roller bearings and its journal is filled by semi-cylindrical flanges 123 extending from the mounting segments 120.

The outer races of the roller bearings 119 are fitted within bearing diaphragms 122 extending into and secured to the crankcase 124. Also, as in the previous modifications, cylinder holddown bolts 126 thread into suitable bosses in the bearing diaphragms 124 whereby the cylinder banks, crankcase and bearing diaphragms comprise a rigid structure. As illustrated, the crankcase 122 is a one-piece cylindrical-type crankcase similar to that of Figure 3. Obviously, however, a polygonal crankcase, similar to that of Figures 1 and 2, may be substituted in Figures 7 and 8.

Each crankpin 116 is surrounded by split rings 128, 130 and 132, the two halves of each ring being secured together by bolts 134. Three similar connecting rods 136 have their shank portions extending outwardly between the end ring 128 and the intermediate ring 130 with the connecting rod slipper portions 138 slidably fitted between the crank pin 116 and the rings 128 and 130. A second set of three connecting rods 137, similar to the rods 136, have their shank portions extending outwardly between the end ring 132 and the intermediate ring 130 with their slipper portions 139 slidably fitted between the crankpin 116 and the rings 130 and 132. The intermediate ring 130 is sufficiently wide so that the slippers 138 and 139 of the two sets of connecting rods do not extend beyond the middle of the ring thereby avoiding interference between the slippers.

With this construction, each crankpin 116 has two sets of connecting rods 136 and 137 and, as best seen in Figure 7, the one set of connecting rods 136 is connected to alternate pistons 112 of a cylinder row while the other set of connecting rods 137 is connected to the other piston 112 of the same row. Accordingly, adjacent cylinders of each cylinder row are offset by an amount equal to the offset of the associated two sets of connecting rods. Also, as illustrated in Figure 1, the slipper portions each subtend an arc of somewhat less than 120° to permit sliding movement between the slippers 138 or 139 of each set of connecting rods during engine operation.

In multi-cylinder radial engines having more than three cylinders in a row, it has heretofore been difficult to provide sufficient arc of embracement of the connecting rod slippers with their crankpins without resorting to a relatively complicated construction. However, with the aforedescribed construction of Figures 7 and 8, applicant provides a slipper rod construction for six cylinders radially disposed about a common crankpin in which each slipper has a similar simple construction and has an arc of embracement sub-tending an angle only slightly less than 120°. In the absence of the aforedescribed alternate offset of the slipper rods 136 and 137, slipper rods serving six radially disposed cylinders from a common crankpin would only have an arc of embracement with said crankpin of less than 60°. Another novel feature of applicant's slipper rod construction comprises the arrangement whereby each intermediate slipper ring 130 cooperates with both adjacent sets of slipper rods. In addition, the split construction of the rings 128, 130 and 132 permits the use of a one-piece crankcase and a one-piece crankshaft as in the modifications of Figures 1-3 and Figure 4.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

I claim as my invention:

In an internal combustion engine; a crankshaft having a crankpin; a row of six radially disposed engine cylinders symmetrically spaced about said crankshaft; pistons slidable in said cylinders; a pair of master connecting rods offset side-by-side on said crankpin and each connected to one of said pistons diametrically opposed to the other master connecting rod piston; and two pairs of auxiliary connecting rods, one pair for each of said master connecting rods, the auxiliary connecting rods of each pair being pivotally connected to their master connecting rod on opposite sides of the shank of their master connecting rod and being connected to the pistons disposed immediately adjacent to and on opposite sides of their master connecting rod piston, the three pistons served by one master connecting rod and its pair of auxiliary connecting rods being offset relative to the other three pistons to an extent equal to said master connecting rod offset.

ROLAND CHILTON.

REFERENCES CITED

The following references are of record in the file of this patent:

UNITED STATES PATENTS

| Number | Name | Date |
|---|---|---|
| 368,189 | Carter | Aug. 16, 1887 |
| 761,325 | Schier | May 31, 1904 |
| 879,289 | Mayo et al. | Feb. 18, 1908 |
| 1,394,419 | Larson | Oct. 18, 1921 |
| 1,626,457 | Foner | Apr. 26, 1927 |
| 1,670,294 | Angle | May 22, 1928 |
| 1,708,901 | Royce | Apr. 9, 1929 |
| 1,962,246 | Leak | June 12, 1934 |
| 1,980,335 | Hewitt et al. | Nov. 13, 1934 |
| 2,005,000 | Miller | June 18, 1935 |
| 2,088,863 | McClelland | Aug. 3, 1937 |